US009193601B2

(12) United States Patent
Ghosh et al.

(10) Patent No.: US 9,193,601 B2
(45) Date of Patent: Nov. 24, 2015

(54) METHOD OF RECYCLING OF BY-PRODUCTS FOR THE PRODUCTION OF SODA ASH AND AMMONIUM SULPHATE

(71) Applicants: Pushpito Kumar Ghosh, Gujarat (IN); Haresh Mahipatlal Mody, Gujarat (IN); Rajesh Shantilal Somani, Gujarat (IN); Pratyush Maiti, Gujarat (IN); Maheshkumar Ramniklal Gandhi, Gujarat (IN); Hari Chand Bajaj, Gujarat (IN); Jatin Rameshchandra Chunawala, Gujarat (IN); Sumesh Chandra Upadhyay, Gujarat (IN)

(72) Inventors: Pushpito Kumar Ghosh, Gujarat (IN); Haresh Mahipatlal Mody, Gujarat (IN); Rajesh Shantilal Somani, Gujarat (IN); Pratyush Maiti, Gujarat (IN); Maheshkumar Ramniklal Gandhi, Gujarat (IN); Hari Chand Bajaj, Gujarat (IN); Jatin Rameshchandra Chunawala, Gujarat (IN); Sumesh Chandra Upadhyay, Gujarat (IN)

(73) Assignee: Council of Scientific & Industrial Research (IN)

(*) Notice: Subject to any disclaimer, the term of this patent is extended or adjusted under 35 U.S.C. 154(b) by 211 days.

(21) Appl. No.: 14/041,856

(22) Filed: Sep. 30, 2013

(65) Prior Publication Data

US 2015/0093309 A1    Apr. 2, 2015

(51) Int. Cl.
*C01D 7/18* (2006.01)
*C01C 1/24* (2006.01)

(52) U.S. Cl.
CPC .... *C01D 7/18* (2013.01); *C01C 1/24* (2013.01)

(58) Field of Classification Search
None
See application file for complete search history.

(56) References Cited

U.S. PATENT DOCUMENTS

| 6,776,972 B2 | 8/2004 | Vohra et al. |
| 7,041,268 B2 | 5/2006 | Ghosh et al. |
| 7,067,456 B2 | 6/2006 | Fan et al. |
| 7,666,234 B2 | 2/2010 | Ghosh et al. |
| 2009/0191114 A1 | 7/2009 | Liu et al. |

FOREIGN PATENT DOCUMENTS

| WO | 2010109492 A1 | 9/2010 |
| WO | 2010113173 A2 | 10/2010 |

*Primary Examiner* — Melissa Swain
(74) *Attorney, Agent, or Firm* — St. Onge Steward Johnston & Reens LLC

(57) ABSTRACT

A method of producing soda ash and ammonium sulphate by recycling by-products of Merseberg and Solvay processes includes treating brine with soda ash distiller waste for desulphatation of the brine to obtain gypsum, recovering pure salt from the desulphated brine and utilizing it in manufacture of soda ash in a Solvay process, washing the gypsum and reacting it with liquor ammonia and carbon dioxide to obtain $CaCO_3$ and ammonium sulphate, separating the $CaCO_3$ from the ammonium sulphate solution and recovering solid ammonium sulphate, washing the $CaCO_3$ followed by calcination to generate $CO_2$ and lime, recycling the $CO_2$ in the Solvay process to obtain soda ash, recycling the lime with ammonium chloride generated in the Solvay process to recover ammonia and obtain distiller waste containing $CaCl_2$ as a by-product, recycling the by-product distiller waste for the desulphatation of the brine, and recycling the ammonia recovered.

9 Claims, 1 Drawing Sheet

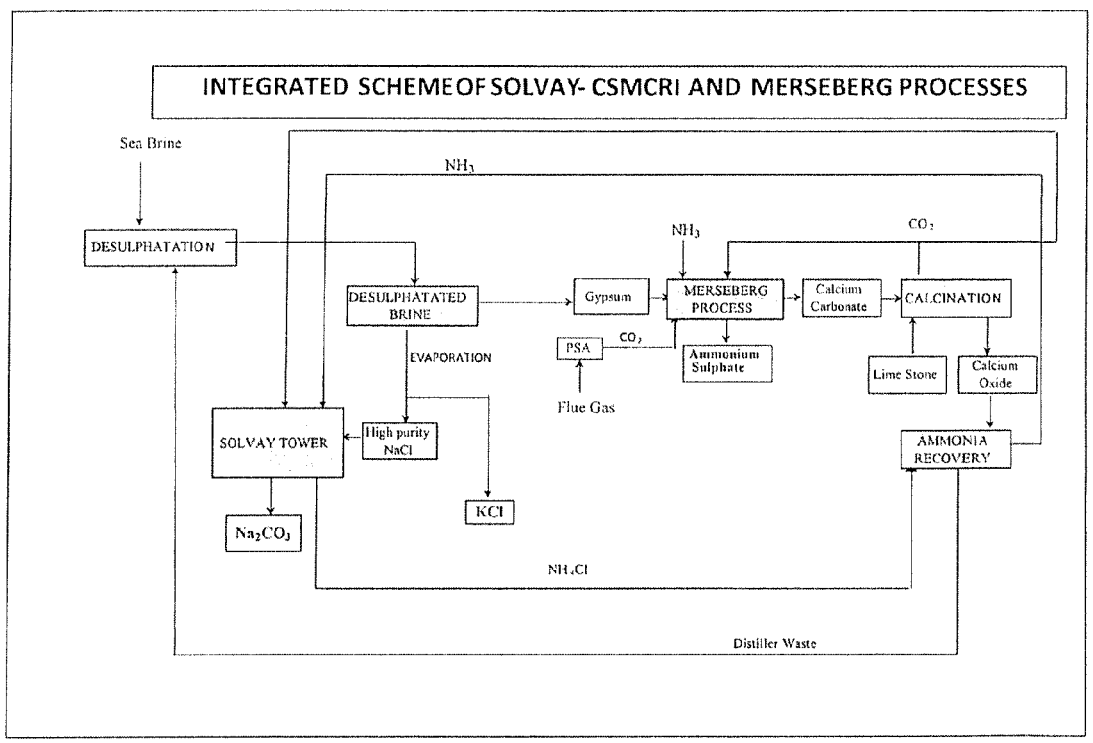

METHOD OF RECYCLING OF BY-PRODUCTS FOR THE PRODUCTION OF SODA ASH AND AMMONIUM SULPHATE

FIELD OF THE INVENTION

The present invention relates to a method for the production of soda ash and ammonium sulphate and, in particular, a method of recycling of by-products of Merseberg and Solvay processes in an integrated manner for the production of soda ash and ammonium sulphate.

BACKGROUND OF THE INVENTION

In 1861, Ernest Gaston Joseph Solvay developed the ammonia-soda process for the manufacture of soda ash (anhydrous sodium carbonate) from brine (source of sodium chloride) and limestone (source of calcium carbonate). The process was an improvement over the earlier Leblanc process. The chemistry of Solvay process involves the following chemical equations 1 to 6.

a. $CaCO_3 \rightarrow CaO + CO_2$ (1)

b. $CaO + H_2O \rightarrow Ca(OH)_2$ (2)

c. $NH_3 + CO_2 + H_2O \rightarrow (NH_4)HCO_3$ (3)

d. $(NH_4)HCO_3 + NaCl \rightarrow NaHCO_3 + NH_4Cl$ (4)

e. $2NH_4Cl + Ca(OH)_2 \rightarrow CaCl_2 + 2NH_3 + 2H_2O$ (5)

f. $2NaHCO_3 \rightarrow Na_2CO_3 + CO_2 + H_2O$ (6)

The main drawback of the Solvay process is the co-generation of $CaCl_2$ (in the form of distiller waste) which is normally discharged into the sea/river. In this connection, reference may be made to U.S. Pat. No. 6,776,972 by Vohra et al., which discloses the utilization of the distiller waste for the purpose of desulphatation of sea/sub-soil brine which, in turn, results in the production of solar salt of superior quality and reduces the cost of downstream purification of brine. Thus for those soda ash manufacturers who are backward integrated to solar salt production, the above process can be of considerable advantage. No mention is made therein of any value addition of the by-product gypsum obtained in the course of desulphatation which would no doubt be a further motivation to implement the process.

Reference may be made to the Merseberg process wherein gypsum is reacted with ammonia and carbon dioxide to obtain ammonium sulphate solution along with calcium carbonate as precipitate (eq 7). The ammonium sulphate liquor can be separated from the calcium carbonate and thereafter evaporated to recover this important fertilizer. No mention is made in the prior art of any application wherein the calcium carbonate so generated is utilized in the Solvay process as substitute of limestone.

$CaSO_4 + 2NH_3 + 2H_2O + CO_2 \rightarrow (NH_4)_2SO_4 + CaCO_3$ (7)

Reference may be made to U.S. Pat. No. 7,041,268 by Ghosh et al. which disclose an integrated process for the recovery of sulphate of potash and magnesia from sea bittern. Gypsum is obtained as a by-product in this process.

Reference is made to the patent application PCT/IN2010/000194 by Ghosh et al. wherein the integrated process for the production of sulphate of potash (SOP), magnesia and ammonium sulphate is disclosed to exploit useful synergies. No reference is made to any integration of the Solvay and Merseberg processes to exploit synergies.

It can be seen from the integrated solar salt-Solvay process (U.S. Pat. No. 6,776,972) and the Merseberg process that there are unexploited synergies between the two in as much as (i) one generates gypsum while the other consumes gypsum, (ii) one generates calcium carbonate and the other consumes calcium carbonate in the form of lime and carbon dioxide, and (iii) both involve similar unit operations in as much as both the reactions use ammonia and carbon dioxide (eqs 3 and 7).

It will be apparent from the process as disclosed in detail below, that integration of the Solvay and Merseberg processes—which is the main object of the invention—is feasible only if there is an additional source of $CO_2$ apart from the $CO_2$ obtained from calcium carbonate. Reference is again made to the Solvay process which involves unit operations at elevated temperatures which would inevitably produce flue gas emissions.

Reference may be made to Wikipedia wherein it is stated that flue gas composition depends on what is being burnt, but that it will usually consist of "mostly nitrogen (typically more than two-thirds) derived from the combustion air, carbon dioxide ($CO_2$) and water vapor as well as excess oxygen (also derived from the combustion air). It further contains a small percentage of pollutants such as particulate matter, carbon monoxide, nitrogen oxides and sulfur oxides".

Reference is made to U.S. Pat. No. 7,666,234 by Ghosh et al. wherein an improved process for the preparation of biodiesel from triglyceride oils through transesterification is disclosed. The patent discloses the neutralization of spent KOH catalyst in the glycerol layer with acid sources including flue gas.

U.S. patent application 20090191114, (Liu Jian et al., Jul. 30, 2009) describes a method for preparing ammonium bicarbonate with flue gas and device thereof. The method includes quantitatively collecting flue gas with a carbon dioxide concentration of about 8 to 15% (volume), decreasing the temperature of the flue gas to about 50° C., or less, with an air-cooling apparatus, then increasing the pressure of the flue gas and finally allowing the flue gas to react with liquid ammonia to produce ammonium bicarbonate. No mention is made of its application in the Merseberg process.

Reference may be made to a large body of prior art such as U.S. Pat. No. 7,067,456 and PCT application no. PCT/IN2010/000187 (Jasra et al.) which describe different methods of enriching the $CO_2$ in flue gas.

OBJECTIVES OF THE INVENTION

The main object of the invention is to provide a method of recycling of by-products of Merseberg process and Solvay process in the integrated process for the production of soda ash and ammonium sulphate employing brine, ammonia and $CO_2$ as raw materials.

Another object of the invention is to integrate the Solvay and Merseberg processes to derive useful synergies.

Another object is to achieve such integration via the improved Solvay process disclosed in the prior art—henceforth referred to as the "Solvay-CSMCRI process"—wherein the distiller waste generated in the Solvay process is utilized to produce a superior quality solar salt (required in the Solvay process itself as also for other applications) with co-generation of by-product gypsum.

Another object is to convert such gypsum into ammonium sulphate via the Merseberg process.

Another object is to recycle in the "Solvay-CSMCRI" process the calcium carbonate co-generated in the Merseberg process.

Another object is to reduce the requirement of outsourced limestone for the Solvay process.

Another object is to take advantage of the similarities in the operations in the Solvay and Merseberg processes.

Another object is to meet the requirement of $CO_2$ in the Merseberg process from flue gases.

Another object is to mitigate flue gas emission to a small extent for a positive effect on climate change.

SUMMARY OF THE INVENTION

Accordingly, the present invention relates to a method of recycling of by-products of Merseberg process and Solvay process in an integrated process for the production of soda ash and ammonium sulphate employing brine, ammonia and $CO_2$ as raw materials. More particularly, the present invention relates to a method for preparing soda ash and ammonium sulphate through synergistic integration of the Solvay and Merseberg processes. At the same time, the invention (i) minimizes the discharge of distiller waste generated in the Solvay process, (ii) self-generates calcium carbonate required in the Solvay process and thereby reduces the requirement for outsourced limestone, and (iii) utilizes a part of the flue gases in the overall process. Potassium chloride can be additionally obtained from the bitterns.

The aim of the present invention is to integrate the Solvay-CSMCRI process and the Merseberg process to derive useful synergies. Specifically, the gypsum obtained through forced desulphatation of sea-/sub soil brine is used as the feedstock in the Merseberg process for the production of ammonium sulphate whereas the calcium carbonate generated in the latter process is calcined and the individual constituents ($CO_2$ and lime) are used in the Solvay-CSMCRI process for the preparation of sodium carbonate and regeneration of ammonia. The $CO_2$ required in the Merseberg process may be derived from flue gases and used as such or after enrichment which will help mitigate greenhouse gases. The desulphated bittern left over after separation of common salt in the Solvay-CSMCRI can be processed further for KCl recovery via intermediate carnallite as disclosed in the prior art.

In an embodiment of the present invention there is provided a method of recycling of by-products of Merseberg process and Solvay process in an integrated process for the production of soda ash and ammonium sulphate employing brine, ammonia and $CO_2$ as raw materials, the process comprising the steps of:

i. treating the brine with soda ash distiller waste for desulphatation of brine to obtain gypsum;

ii. recovering pure salt from desulphated brine and utilizing it in manufacture of soda ash in Solvay process;

iii. washing the gypsum obtained in step (i) and reacting it with liquor ammonia and carbon dioxide to obtain $CaCO_3$ and ammonium sulphate;

iv. separating $CaCO_3$ from the ammonium sulphate solution obtained in step (iii), and recovering solid ammonium sulphate from the solution;

v. washing the $CaCO_3$ obtained in step (iv) followed by calcination to generate $CO_2$ and lime;

vi. recycling the $CO_2$ from step (v) in the Solvay process to obtain soda ash;

vii. recycling the lime from step (v) with ammonium chloride generated in the Solvay process to recover ammonia and obtain distiller waste as a by-product;

viii. recycling the by-product distiller waste containing $CaCl_2$ obtained in step (vii) for the desulphatation of brine in step (i); and ix. recycling ammonia recovered from step (vii) in step (iii).

In another embodiment of the present invention, the brine/bittern used in step (i) is selected from the group consisting of ocean brine, sea brine, subsoil brine and lake brine comprising 1-15% (w/v) NaCl and 0.1-1.5% (w/v) sulphate.

In another embodiment of the present invention, the $CO_2$ required in step (iii) is obtained from flue gas emitted during the recycling process.

In another embodiment of the present invention, 0.385 ton of $CO_2$ from flue gas is sequestered per ton of ammonium sulphate produced in the reaction of step (iii).

In another embodiment of the present invention, the flue gas is used after compression or after enrichment with $CO_2$ and then as such or after compression.

In another embodiment of the present invention, the yield of ammonium sulphate in step (iii) is in the range of 10-100%, more particularly in the range of 80-95% when the reaction temperature is in the range of 50-80° C., the pressure of flue gas composition is in the range of 150-250 psig, and the reaction time is in the range of 2-4 hours.

In another embodiment of the present invention, the gypsum produced in step (i) is sufficient to meet 15-30% of the calcium carbonate required in the form of CaO and $CO_2$ in steps (vi) and (vii) and thereby reduce the outsourcing of limestone in proportionate amount.

In another embodiment of the present invention, the entire requirement of limestone for the Solvay process [steps (vi) and (vii)] is met and the entire distiller waste utilized in the desulphatation of step (i) when the brine intake for desulphatation followed by salt production matches the quantity of distiller waste generated.

In another embodiment of the present invention, the desulphated brine from step (ii) is processed further for recovery of KCl.

BRIEF DESCRIPTION OF DRAWING

FIG. 1: Integrated Scheme of Solvay-CSMCRI and Merseberg Processes

DETAILED DESCRIPTION OF THE INVENTION

FIG. 1 shows the schematic depiction of the integration of the Solvay-CSMCRI process with the Merseberg process whereas eqn. 8-16 provides the stoichiometries of the various reactions.

a. $2NaCl + 2NH_3 + 2H_2O + 2CO_2 \rightarrow 2NaHCO_3 + 2NH_4Cl$    (8)

b. $2NaHCO_3 \rightarrow Na_2CO_3 + H_2O + CO_2$    (9)

c. $2NH_4Cl + Ca(OH)_2 \rightarrow CaCl_2 + 2H_2O + 2NH_3$    (10)

d. $CaCl_2 + Na_2SO_4$ (in brine) $\rightarrow CaSO_4 + 2NaCl$    (11)

e. $CaSO_4 + 2NH_3 + CO_2 + H_2O \rightarrow CaCO_3 + (NH_4)_2SO_4$    (12)

f. $CaCO_3 \rightarrow CaO + CO_2$    (13)

g. $CaO + H_2O \rightarrow Ca(OH)_2$    (14)

h. $C$ (Lignite) $+ O_2 \rightarrow \Delta + CO_2$ (flue gas)    (15)

i. Net: Brine$+NH_3+$lignite$\rightarrow Na_2CO_3 + (NH_4)_2SO_4$    (16)

Taking the case of sea brine, it has 2.74% (w/v) NaCl and 0.0274% (w/v) sulphate. For the practical case of 80% recovery of NaCl from seawater, one gets 0.374 mole NaCl per litre of seawater. Since 2 moles of NaCl is required per mole of soda ash (eq 8, 9), it would mean that ca. 5 litres of seawater is required for this purpose. Such amount of seawater would contain 0.143 mole of sulphate which would require 0.143 mole of $CaCl_2$ for desulphatation (eq 11). In actual practice the amount would be higher entailing the consumption of ca. 20% of the distiller waste generated from the Solvay process. If salt is produced for use other than in soda ash production, then, of course, one could recycle still higher amounts of the distiller waste. In the ideal situation wherein the entire amount of distiller waste is recycled, the gypsum produced would be adequate to yield enough calcium carbonate via the Merseberg process (eq 12) to eliminate the need for outsourced limestone for the Solvay process. The Merseberg process would, of course, require ammonia and carbon dioxide as raw materials besides gypsum. The ammonia so utilized would end up in the product as ammonium sulphate. The $CO_2$ which is sequestered in the calcium carbonate can be obtained as per the present invention from flue gas. Such flue gas can be used directly where specifications of products allow such use or, alternatively, the flue gas can be purified prior to use as known in the prior art.

In the description below, for the purposes of explanation, specific details are set forth in order to provide a thorough understanding of the present invention. It will be apparent, however, to one skilled in the art that the present invention may be practiced without some of these specific details. Any number of variations of the inventive concept is anticipated within the scope and spirit of the present invention. In this regard, the particular illustrated example embodiments are not provided to limit the invention but merely to illustrate it. Thus, the scope of the present invention is not to be determined by the specific examples provided but only by the plain language of the following claims.

An embodiment of the present invention provides an integrated process, for the production of soda ash and ammonium sulphate, employing brine, ammonia and $CO_2$ as raw materials, comprising:

(i) treating the brine with soda ash distiller waste for desulphatation of the brine and using the resultant gypsum in the Merseberg process (step (iii));

(ii) recovering pure salt from the desulphated brine and utilizing it in the manufacture of soda ash;

(iii) washing the gypsum obtained in step (i) and reacting it with liquor ammonia and carbon dioxide to obtain ammonium sulphate in solution form and $CaCO_3$ as precipitate;

(iv) separating $CaCO_3$ from the ammonium sulphate solution and recovering solid ammonium sulphate from the solution;

(v) washing the $CaCO_3$ followed by calcination to generate $CO_2$ and lime;

(vi) recycling the $CO_2$ from step (v) in the Solvay process to obtain soda ash;

(vii) recycling the lime from step (v) for recovery of ammonia from ammonium chloride generated as part of the Solvay process.

(viii) supplementing additional requirement of $CO_2$ and lime for the Solvay process using outsourced limestone; and (ix) recycling the by-product distiller waste (containing $CaCl_2$) obtained in step (vii) for the desulphatation process (step (i)).

Novel Features and Inventive Steps

The main inventive steps are the following:

I. Recognising the opportunity to integrate the Solvay-CSMCRI and Merseberg processes.

II. Further recognising that such integration can be achieved cost-effectively.

III. Further recognising that 0.143 mole of gypsum can be obtained per mole of soda ash produced by the Solvay-CSMCRI process when NaCl is derived from sea brine and that, therefore, ammonium sulphate and by-product calcium carbonate can be obtained in similar amounts.

IV. Further recognising that by recycling the calcium carbonate in the Solvay process, requirement of outsourced limestone can be reduced by nearly 20%.

V. Recognising further that if a unit were to produce pure solar salt not only for soda ash manufacture but also for other applications amounting to ca. 5 times the requirement for soda ash, then the entire amount of distiller waste generated in the Solvay process may be utilized and further the entire requirement of limestone can be met.

VI. Further recognising that the requirement of $CO_2$ for the Merseberg process can be met out of flue gas and also recognising that if all of the distiller waste from soda ash production were to be converted into gypsum by the Solvay-CSMCRI process, then 1 ton of $CO_2$ from flue gas can be effectively sequestered per tonne of soda ash produced.

VII. Further recognising that integration of the Solvay-CSMCRI and Merseberg processes is advantageously done given that ammonia and gaseous $CO_2$ are handled in both processes.

The following examples are given by way of illustration and should not be construed to limit the scope of present invention.

EXAMPLE 1

10,000 L of ~3.8° Be' sea brine with $SO_4^{2-}$ concentration of 2.74 g/L was subjected to desulphatation by adding 290 L of soda ash distiller waste having 12% (w/v) $CaCl_2$ concentration. 42 kgs of gypsum having purity of 92.5% (as $CaSO_4$) was produced.

EXAMPLE 2

100 g of gypsum of Example 1 was suspended in 400 ml of solution containing 25.4 g of ammonia taken in a 750 ml capacity high pressure reactor. The mixture was agitated continuously at about 500 rpm. Temperature of the reaction mass was raised to 60° C. Then nitrogen gas was introduced to the high pressure reactor through a gas inlet valve, outlet of which was made to dip into the reacting mass, and the pressure was adjusted to 113 psig. Then $CO_2$ was introduced continuously into the high pressure reactor through the same gas inlet valve, keeping the total pressure at 133 psig so as to achieve the simulated flue gas composition (15±1% $CO_2$ and 85±1% $N_2$) after removal of impurities such as SOx and NOx. During first two hours, increase in the pressure of the reactor was not observed due to the consumption of $CO_2$ introduced. However, the temperature increased from 60 to 70° C. during initial 15 minutes and then gradually decreased to 60±3° C. over a period of 2 h. After two hours the pressure of reactor started increasing and became constant at 133 psig over a period of 10 minutes. Reaction was continued for another 5 minutes. Total reaction time was 2 h 15 minutes. The reaction was quenched by releasing the gas from gas releasing valve of the reactor and removing the reaction mass in slurry form.

Solids from the reaction mass slurry were separated by filtration and the solid residues was washed with water and finally dried at 110° C. It yielded 61.2 g of solids containing 83.8% $CaCO_3$, 11.4% $CaSO_4$, 2.35% acid insoluble and 0.4% $MgCO_3$. The conversion of gypsum to $CaCO_3$ was 72%. Total of 64.7 g ammonium sulphate was recovered.

EXAMPLE 3

The experiment of Example 2 was repeated maintaining a lower temperature of 34° C. and total pressure (of $CO_2$ and $N_2$) of 203 psi with other similar gas composition as in Example 2. The yield of ammonium sulphate was only 10.5 g.

EXAMPLE 4

The experiment of Examples 2 and 3 were repeated maintaining the initial temperature at 60° C. as in Example 2 and total pressure (of $CO_2$ and $N_2$) of 203 psi as in Example 3. Then nitrogen gas was introduced to the high pressure reactor through a gas inlet valve, outlet of which was dip into the reacting mass, and the pressure was adjusted to about 174 psig. The yield of ammonium sulphate was 73.8 g.

Examples 2-4 teach us that ammonium sulphate can be produced using the gypsum obtained through desulphatation of sea brine, $CO_2$ composition simulating flue gas composition in as much as the main constituents are concerned, initial temperature in the range of 34-60° C., and total pressure in the range of 133-203 psig and reaction time of 2.25 h. The example further teaches us that temperature and pressure play an important role and that for temperature of 60° C. and pressure of 203 psi the yield of ammonium sulphate was 82.2% with respect to the gypsum taken.

EXAMPLE 5

25 g of solid residue of example 4 containing ~90% $CaCO_3$ was calcined at 850° C. for 2 h and the resultant weight of the calcined mass was 15.4 g tallying closely with the theoretical mass expected (0.56×0.9×25+2.5=15.1) for $CO_2$ loss from 90% pure $CaCO_3$ and assuming no loss of weight of remaining material on calcination. The $CO_2$ can be directly recycled in the Solvay process although not done specifically in the present example for its obviousness. The calcined mass was slaked with 100 ml water. This slaked lime slurry was added to 170 ml aqueous solution containing 21.4 g of ammonium chloride taken in the Kjeldahl distillation assembly. The final concentration of ammonium chloride in the reaction mixture was about 8% w/v. The reaction mixture was boiled for 2 h. Liberated ammonia was purged in sulfuric acid of known concentration through a tip of condenser of the assembly. The quantity of ammonia trapped as ammonium sulfate was estimated titrimetrically and 93.75% ammonia was recovered (0.4 moles $NH_4Cl$ taken and 0.375 moles $NH_3$ recovered). The reaction mass was filtered to remove insoluble, the volume of filtrate was 200 ml having $CaCl_2$ content of 10.6% w/v. This solution can be used for the desulphatation of brine as shown in example 1.

This example teaches us the recycle of calcium carbonate obtained in Examples 2-4.

EXAMPLE 6

The desulphated brine from Example 1, was subjected to solar evaporation and yield 220 kg of pure NaCl in the density range of 25 to 29° Be' for utilization in soda ash manufacture by the Solvay process. After separation of salt, the mother liquor is evaporated further to recover carnallite which, on decomposition and purification, yields KCl.

Advantages of the Present Invention

The main advantages of the present invention are:
(i) Value addition of the gypsum obtained from forced desulphatation of brine with distiller waste of soda ash industry as part of the Solvay-CSMCRI process, which would provide greater motivation to soda ash manufacturers backward integrate to salt production to implement the said process.
(ii) Recycling of by-product calcium carbonate generated in the course of converting gypsum into ammonium sulphate thereby reducing the requirement of outsourced lime for the Solvay process while, at the same time, managing the problem of disposal.
(iii) Utilization of flue gas as source of $CO_2$ in the Merseberg process of gypsum value addition and thereby making a useful contribution towards the burning issue of green house gases and climate change.
(iv) Integration of the Solvay-CSMCRI and Merseberg processes is advantageously done given that ammonia and gaseous $CO_2$ are handled in both processes.

We claim:

1. A method of recycling of by-products of Merseberg process and Solvay process in an integrated process for the production of soda ash and ammonium sulphate employing brine, ammonia and $CO_2$ as raw materials, the process comprising the steps of:
   i. treating the brine with soda ash distiller waste for desulphatation of brine to obtain gypsum;
   ii. recovering pure salt from desulphated brine and utilizing it in manufacture of soda ash in Solvay process;
   iii. washing the gypsum obtained in step (i) and reacting it with liquor ammonia and carbon dioxide to obtain $CaCO_3$ and ammonium sulphate;
   iv. separating $CaCO_3$ from the ammonium sulphate solution obtained in step (iii), and recovering solid ammonium sulphate from the solution;
   v. washing the $CaCO_3$ obtained in step (iv) followed by calcination to generate $CO_2$ and lime;
   vi. recycling the $CO_2$ from step (v) in the Solvay process to obtain soda ash;
   vii. recycling the lime from step (v) with ammonium chloride generated in the Solvay process to recover ammonia and obtain distiller waste as a by-product;
   viii. recycling the by-product distiller waste containing $CaCl_2$ obtained in step (vii) for the desulphatation of brine in step (i); and
   ix. recycling ammonia recovered from step (vii) in step (iii).

2. The process as claimed in claim 1, wherein the brine used in step (i) is selected from the group consisting of ocean brine, sea brine, subsoil brine and lake brine comprising 1-15% (w/v) NaCl and 0.1-1.5% (w/v) sulphate.

3. The process as claimed in claim 1, wherein the $CO_2$ in step (iii) is obtained from flue gas emitted during said recycling process.

4. The process as claimed in claim 1, wherein 0.385 ton of $CO_2$ from flue gas is sequestered per ton of ammonium sulphate produced in the reaction of step (iii).

5. The process as claimed in claim 1, wherein the flue gas is used after compression or after enrichment with $CO_2$ and then as such or after compression.

6. The process as claimed in claim 1, wherein the yield of ammonium sulphate in step (iii) is in the range of 10-100%, more particularly in the range of 80-95% when the reaction temperature is in the range of 50-80° C., the pressure of flue gas composition is in the range of 150-250 psig, and the reaction time is in the range of 2-4 hours.

7. The process as claimed in claim 1, wherein the gypsum produced in step (i) is sufficient to meet 15-30% of the calcium carbonate required in the form of CaO and $CO_2$ in steps (vi) and (vii) and thereby reducing the outsourcing of limestone in proportionate amount.

8. The process as claimed in claim 1 wherein the total requirement of limestone for the Solvay process [steps (vi) and (vii)] is met and the entire distiller waste is utilized in the desulphatation of step (i) when the brine intake for desulphatation followed by salt production matches the quantity of distiller waste generated.

9. The process as claimed in claim 1, wherein the desulphated brine of step (ii) is processed further for recovery of KCl.

\* \* \* \* \*